United States Patent Office 3,510,460
Patented May 5, 1970

3,510,460
OXADIAZINE-4-THIONES AND VULCANIZABLE
RUBBER COMPOSITIONS CONTAINING SAME
Elmer A. Fike, Nitro, W. Va., assignor to Security
Chemicals, Inc., Nitro, W. Va.
No Drawing. Filed Sept. 21, 1967, Ser. No. 669,389
Int. Cl. C08c 11/54; C08f 27/06; C07d 87/00
U.S. Cl. 260—79.5                                   12 Claims

ABSTRACT OF THE DISCLOSURE

This invention relates to oxadiazine-4-thiones and to vulcanizable rubber compositions, containing these oxadiazine-4-thiones which are characterized by excellent cure speed.

---

This invention relates to oxadiazine-4-thione compounds and to rubber compositions containing these compounds. More specifically, this invention relates to oxadiazine-4-thione compounds which, when added to unvulcanized rubber, provide compositions which can be cured or vulcanized in a relatively short period of time to products which are characterized by excellent physical properties.

In its unvulcanized state, rubber has no definite shape and is characterized by non-elastic properties. As a result, in this state, rubber finds limited use in its scope of applicability. Once vulcanized, however, rubber is cross-linked to a solid product which is characterized by elastic properties and by otherwise highly improved physical properties.

As a general rule, rubber is vulcanized by sulfur or by a heat-hardenable phenol-formaldehyde resin. The utilization of sulfur or a heat-hardenable phenol-formaldehyde resin has not been found to be particularly desirable. Sulfur tends to migrate within the rubber compositions, especially under the influence of heat and pressure. Consequently, upon prolonged use, the resultant product tends to crack.

The use of heat-hardenable phenol-formaldehyde resins as vulcanizing agents for rubber has not been particularly effective as the resultant vulcanized product does not possess particularly good elastic properties. Also, phenol-formaldehyde resins, currently used as vulcanizing agents, are slow to effect complete vulcanization of the rubber with which they are admixed.

The present invention provides for oxadiazine-4-thione compounds which, when added to unvulcanized rubber are non-migratory and vulcanize the rubber compositions in a relatively short period of time to products which are characterized by excellent physical properties.

The oxadiazine-4-thione compounds which are added to unvulcanized rubber to provide the vulcanizable rubber compositions of this invention have the formula:

FORMULA I

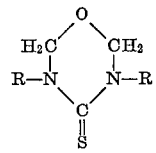

wherein, each R which can be the same or different, is hydrogen or a monovalent hydrocarbon radical and when a hydrocarbon radical, generally containing 1 to 8 carbon atoms inclusive and preferably containing 2 to 4 carbon atoms inclusive. Illustrative of suitable radicals for R are the following: alkyl radicals such as methyl, ethyl, n-propyl, isopropyl, n-butyl, n-hexyl, 2-ethylhexyl, n-octyl, and the like; cycloaliphatic radicals such as cyclopentyl, cyclohexyl, and the like; aryl radicals such as phenyl and the like; alkaryl radicals such as o-methylphenyl, p-ethylphenyl, o-n-butylphenyl, and the like; arylkyl radicals such as benzyl, 2-phenylethyl and the like, and unsaturated radicals such as allyl, cyclopentenyl and the like.

Particularly desirable oxadiazine-4-thione compounds are those falling within the scope of Formula I wherein at least one R contains at least two carbon atoms, preferably 2 to 4 carbon atoms inclusive. These compounds, when admixed with rubber, provide compositions which will not precure or scorch during processing. Rubber compositions containing these compounds fully cure only on being heated to curing temperatures thus making the curing thereof easier to control.

The tetrahydro-3,5-dimethyl - 4H - 3,5 - oxadiazine - 4-thione is disclosed in the literature. Thus, the preparation of the compound by the reaction of formaldehyde and dimethyl thiourea is disclosed in Macromol. Chem. 15, 75–90 (1955), Staudinger et al.

The preparation of an oxadiazine-4-thione falling within the scope of Formula I in accordance with this invention can be illustrated by the reaction between paraformaldehyde and a 1,3-disubstituted thiourea as indicated below.

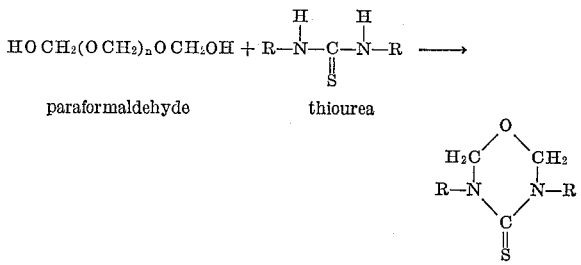

wherein each R is as previously defined.

Various amounts of paraformaldehyde and a thiourea can be reacted to produce the corresponding oxadiazine-4-thione compounds. Satisfactory yields of an oxadiazine-4-thione compound can be obtained using at least 2 moles of paraformaldehyde per mole of thiourea. As a general rule, the amount of materials used ranges from about 2 moles to about 4 moles and preferably about 2 moles to about 2.5 moles paraformaldehyde per mole of thiourea. Using more than about 3 moles of paraformaldehyde per mole of thiourea can be used, but this does not materially increase the yield of oxadiazine-4-thione and is economically unattractive.

The reaction between paraformaldehyde and a thiourea is conducted in a substantially anhydrous medium. Under these conditions, relatively high yields of oxadiazine-4-thione products are obtained.

The temperature at which the reaction between the paraformaldehyde and thiourea is conducted can be varied over a wide range from as low as 50° C. to a temperature as high as 100° C. At temperatures lower than about 70° C., the reaction proceeds slowly. A temperature in the range of about 70° C. to about 80° C. is most preferred.

In conducting the reaction between paraformaldehyde and thiourea, it is customary to utilize a mineral acid catalyst. Exemplary of such catalysts are sulfuric acid, hydrochloric acid and the like.

The amount of acid utilized is sufficient to catalyze the reaction between paraformaldehyde and the thiourea. It is customary to use about 1 gm. to about 2 gms. of acid per mole of thiourea.

The reaction between paraformaldehyde and thiourea can be conducted under atmospheric, superatmospheric or subatmospheric pressures although atmospheric pressure is preferred.

As a general rule, in conducting the reaction between paraformaldehyde and thiourea, the reaction mixture heated to elevated temperatures, on the order previously described, and maintained at these elevated temperatures for about 24 hours.

The oxadiazine-4-thione is conveniently recovered from the reacted mixture by heating the reacted mixture to remove the liquids and recovering the solid crystals remaining.

The oxadiazine-4-thiones of this invention, as previously stated, are particularly desirable for use as vulcanizing agents for rubber. As a rule, about 0.2 to about 2 percent by weight, based on the weight of the unvulcanized rubber, will vulcanize the rubber to a cured or vulcanized product in a relatively short period of time. For optimum results it is preferred to use about 0.5 percent by weight to about 1 percent by weight oxadiazine-4-thiones based on the weight of the unvulcanized rubber.

The vulcanizable compositions of this invention can be formulated by being admixed in any suitable apparatus, as for example a Banbury mixer.

The compositions of this invention can be vulcanized by being heated at elevated temperatures, generally on the order of about 100° C. to about 200° C., and preferably on the order of about 120° C. to about 160° C. The exact curing or vulcanization temperature will vary and depend in part upon the exact formulation of the compositions.

A wide variety of rubbers, both natural and synthetic, can be vulcanized by the oxadiazine-4-thiones of this invention. Illustrative of such rubbers are the natural rubbers; balata, caoutchouc, caucho gutta percha, guttasiak, juleting, kickxia, manihot, latex from the *Hevea brasiliensis*; synthetic diene polymers, such as homo polymers of hydrocarbons containing two unsaturated bonds such as butadiene-1,3, isoprene, 2,3-dimethyl butadiene-1,3, halogenated butadienes such as 2-chlorobutadiene-1,3, and the like, or copolymers of these with one or more copolymerizable mono-olefinic compounds. Copolymerizable mono-olefinic compounds are organic compounds which contain a single olefinic double bond: $>C=C<$ and which are copolymerizable with butadiene-1,3 hydrocarbons. Such compounds are usually low molecular weight compounds of less than 10 carbon atoms which contain at least two hydrogen atoms and at least one radical other than hydrogen attached to the unsaturated double bond carbon atoms, as in the structure: $H_2C=C<$ wherein at least one of the disconnected valences is attached to a group other than hydrogen, such as, chlorine, alkyl, alkoxy, acyl, cyano or aryl.

Examples of such compounds include styrene, p-methyl styrene, alpha-methyl styrene, p-chloro styrene, vinyl naphthalene and similar aryl olefins and substituted aryl olefins; isobutylene and similar copolymerizable olefinic hydrocarbons; acrylic and substituted acrylic acid, acrylonitrile, methacrylonitrile, alpha - chloroacrylonitrile, methyl acrylate, methyl methacrylate, ethyl methacrylate, methyl alpha-chloroacrylate, acrylamide, methacrylamide and the like; vinyl methyl ketone, vinyl methyl ether, vinylidene chloride, N-vinyl carbazole, N-vinyl pyrrolidone and similar copolymerizable compounds containing a single olefinic double bond.

As stated any rubbery copolymer prepared by the copolymerization of a butadiene-1,3-hydrocarbon and a copolymerizable mono-olefinic compound can be vulcanized by the oxadiazines of this invention. The most common rubbery copolymers are copolymers of butadiene-1,3 with a lesser amount of styrene, acrylonitrile or an acrylic ester; or the copolymers of isoprene and isobutylene. Such copolymers are known commercially under such names as "Amerpol," "Hycar," "Perbunan," "Buna S," "GR-S," "Chenugum," "Butyl Rubber" and "Flexon."

Other suitable rubbers are those produced on interpolymerizing ethylene, propylene and diene monomers such as hexadiene-1,4 and the like.

It is to be understood that fillers such as carbon black and other additives well-known in the art can be added to the compositions of this invention, if so desired.

The following examples further illustrate the present invention and are not intended to limit the scope thereof in any manner.

EXAMPLE 1

Preparation of tetrahydro-3,5-dimethyl-4H-1,3,5-oxadiazine-4-thione

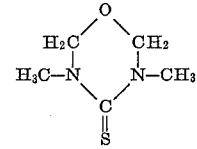

Into a reaction flask, there was charged 1 mole of dimethyl substituted thiourea

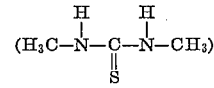

2 moles of paraformaldehyde and 1 gram of concentrated sulfuric acid. The reaction mixture was heated at a temperature of about 70° C. for 24 hours. After 24 hours at 70° C. the oxadiazine-4-thione was recovered as solid crystals, and purified by crystallization from acetone. The yield was 78% and the melting point was 113° C.

In a like manner, as described in Example 1, oxadiazines were prepared by reacting formaldehyde with various thioureas indicated below, using the same relative amounts as described in Example 1, to produce the corresponding oxadiazines.

EXAMPLE 2

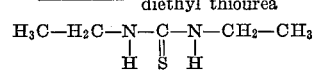

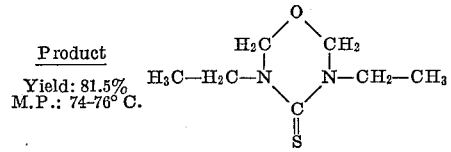

tetrahydro-3,5-diethyl-4H-1,3,5-oxadiazine-4-thione

EXAMPLE 3

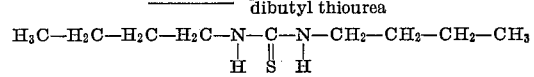

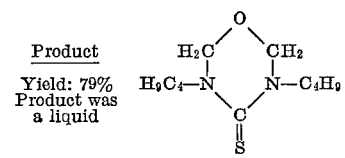

tetrahydro-3,4-dibutyl-4H-1,3,5-oxadiene-4-thione

EXAMPLE 4

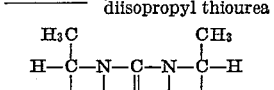

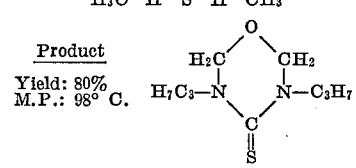

tetrahydro-3,5-diisopropyl-4H-1,3,5-oxadiazine-4-thione

EXAMPLE 5

Reactants—paraformaldehyde diallyl thiourea

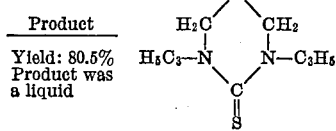

Product

Yield: 80.5%
Product was a liquid tetrahydro-diallyl-4H-1,3,5-oxadiazine-4-thione Compositions, the formulations of which are noted in Table I below, were prepared by mixing on a two roll mill to a blend and then subjected to various tests. Each test and the results thereof are noted in the tables below. Amounts noted in the tables are parts by weight.

What is claimed is:

1. A vulcanizable composition comprising rubber and an oxadiazine-4-thione having the formula:

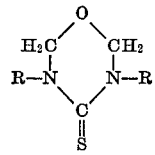

wherein R is selected from the group consisting of hydrogen and a monovalent hydrocarbon radical having 1 to 8 carbon atoms inclusive wherein said oxadiazine-4-thione is present in an amount of about 0.2 to about 2.0 percent by weight based on the weight of the said rubber.

2. A vulcanizable composition as defined in claim 1 wherein the said oxadiazine-4-thione is present in an amount of about 0.5 to about 1 percent by weight based on the weight of the said rubber.

TABLE I

| | Compositions | | | | | | | | | | Controls | | | | | |
|---|---|---|---|---|---|---|---|---|---|---|---|---|---|---|---|---|
| | A | B | C | D | E | F | G | H | I | J | 1 | 2 | 3 | 4 | 5 | 6 |
| Rubbery homopolymer of 2 chlorobutadiene-1,3 | 100 | 100 | 100 | 100 | 100 | 100 | 100 | 100 | 100 | 100 | 100 | 100 | 100 | 100 | 100 | 100 |
| Phenyl-2-napthylamine | 2 | 2 | 2 | 2 | 2 | 2 | 2 | 2 | 2 | 2 | 2 | 2 | 2 | 2 | 2 | 2 |
| Magnesia | 4 | 4 | 4 | 4 | 4 | 4 | 4 | 4 | 4 | 4 | 4 | 4 | 4 | 4 | 4 | 4 |
| Stearic acid | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Carbon black | 75 | 75 | 75 | 75 | 75 | 75 | 75 | 75 | 75 | 75 | 75 | 75 | 75 | 75 | 75 | 75 |
| Petroleum oil | 15 | 15 | 15 | 15 | 15 | 15 | 15 | 15 | 15 | 15 | 15 | 15 | 15 | 15 | 15 | 15 |
| Zinc oxide | 5 | 5 | 5 | 5 | 5 | 5 | 5 | 5 | 5 | 5 | 5 | 5 | 5 | 5 | 5 | 5 |
| Oxadiazine of Example 1 | 0.5 | 1.0 | | | | | | | | | | | | | | |
| Oxadiazine of Example 2 | | | 0.5 | 1.0 | | | | | | | | | | | | |
| Oxadiazine of Example 3 | | | | | 0.5 | 1.0 | | | | | | | | | | |
| Oxadiazine of Example 4 | | | | | | | 0.5 | 0.6 | | | | | | | | |
| Oxadiazine of Example 5 | | | | | | | | | 0.5 | 0.6 | | | | | | |
| 2 mercapto-imidazoline | | | | | | | | | | | 0.5 | 0.5 | 0.6 | 1.0 | | |
| Sodium dibutyl dithiocarbamate | | | | | | | | | | | | | | | 0.5 | 1.0 |

In order to further indicate the excellent cures with the compositions of this invention, these compositions and control compositions were subjected to tests indicated in Table II. The results of these tests are also indicated in Table II.

3. A vulcanizable composition as defined in claim 1 wherein the rubber is a dienepolymer.

4. A vulcanizable composition as defined in claim 1 wherein the rubber is a homopolymer of 2-chlorobutadiene-1,3.

TABLE II

| | Compositions | | | | | | | | | | Controls | | | | | |
|---|---|---|---|---|---|---|---|---|---|---|---|---|---|---|---|---|
| | A | B | C | D | E | F | G | H | I | J | 1 | 2 | 3 | 4 | 5 | 6 |
| Mooney Scorch at 121° C.: | | | | | | | | | | | | | | | | |
| t₅ in minutes | 6.3 | 3.3 | 10.4 | 6.4 | 9.0 | 6.7 | 24.7 | 26.2 | 29.5 | 26.0 | 6.9 | 5.6 | 5.7 | 5.7 | 5.2 | 4.9 |
| t₃₅ in minutes | | | 16.4 | | | | 46.2 | 39.9 | 71.0 | 71+ | | 11.1 | 11.1 | | | |
| t₃₅-t₅ in minutes | | | 6.0 | | | | 21.5 | 13.7 | 41.5 | 45+ | | 5.5 | 5.4 | | | |
| Rheometer at 153° C.: | | | | | | | | | | | | | | | | |
| t₂ in minutes | 3.2 | 2.0 | 4.5 | 3.4 | 4.0 | 3.0 | 6.3 | 6.0 | 7.0 | 5.0 | 3.0 | 2.7 | 2.4 | 2.8 | 2.9 | 2.8 |
| t₉₀ in minutes | 21.9 | 11.0 | 35.9 | 23.2 | 34.0 | 19.8 | 64.0 | 60.0 | 83.0 | 78.0 | 52.2 | 35.0 | 31.0 | 30.2 | 36.3 | 32.2 |
| t₉₀-t₂ in minutes | 18.7 | 9.0 | 31.4 | 19.8 | 30.0 | 16.8 | 57.7 | 54.0 | 76.0 | 73.0 | 49.2 | 32.2 | 28.6 | 27.4 | 33.4 | 29.4 |

Additional tests by standard ASTM methods were conducted in order to establish the excellent vulcanization or cure of the compositions of this invention, these tests and the results thereof noted in Table III. A tensile strength of at least 1000 p.s.i. after vulcanization is evidence of "good cure." Other indications of "good cure" are no substantial decrease in physical properties after aging at elevated temperatures.

5. A vulcanizable composition as defined in claim 1 wherein the oxadiazine is tetrahydro-3,5-dimethyl-4H-1,3,5-oxadiazine-4-thione.

6. A vulcanizable composition as defined in claim 1 wherein the oxadiazine is tetrahydro-3,5-diethyl-4H-1,3,5-oxadiazine-4-thione.

7. A vulcanizable composition as defined in claim 1

TABLE III

| | Compositions | | | | | | | |
|---|---|---|---|---|---|---|---|---|
| | A | B | C | D | E | F | G | H |
| Cure time in minutes at 153° C | 25 | 15 | 50 | 25 | 35 | 20 | 45 | 25 |
| Ultimate tensile strength, p.s.i. (ASTM) | 2,800 | 2,800 | 2,500 | 2,800 | 2,400 | 2,700 | 2,600 | 2,900 |
| Ultimate elongation, percent (ASTM) | 200 | 180 | 240 | 190 | 230 | 220 | 200 | 230 |
| Hardness, Shore A | 68 | 70 | 65 | 65 | 65 | 68 | 66 | 68 |
| Aged 48 hours at 120° C.: | | | | | | | | |
| Ultimate tensile strength, p.s.i. (ASTM) | 2,900 | 3,000 | 2,700 | 2,800 | 2,700 | 2,800 | 2,900 | 3,000 |
| Ultimate elongation, percent (ASTM) | 200 | 170 | 200 | 190 | 200 | 220 | 220 | 200 |
| Retained tensile strength, percent | 104 | 107 | 108 | 100 | 121 | 110 | 117 | 104 |
| Retained elongation, percent | 100 | 94 | 83 | 100 | 87 | 100 | 110 | 87 | wherein the oxadiazine is tetrahydro-3,5-dibutyl-4H-1,3,5-oxadiazine-4-thione.

8. A vulcanizable composition as defined in claim 1 wherein the oxadiazine is tetrahydro-3,5-diisopropyl-4H-1,3,5-oxadiazine-4-thione.

9. A vulcanizable composition as defined in claim 1 wherein the oxadiazine is tetrahydro-3,5-diallyl-4H-1,3,5-oxadiazine-4-thione.

10. A process of vulcanizing rubber which comprises admixing a vulcanizable rubber with about 0.2 to about 2 percent by weight, based on the weight of said rubber, of an oxadiazine-4-thione as defined in claim 1 and heating the resultant composition at elevated temperatures for a period of time to vulcanize said composition.

11. A process as defined in claim 10 wherein the said composition is heated at a temperature of about 100° C. to about 200° C.

12. A process as defined in claim 10 wherein said oxadiazine-4-thione is used in an amount of about 0.5 to about 1 percent by weight.

No references cited.

JOSEPH L. SCHOFER, Primary Examiner

C. A. HENDERSON, JR., Assistant Examiner

U.S. Cl. X.R.

260—784, 244, 23.7, 41.5, 45.9